(12) United States Patent
Luo et al.

(10) Patent No.: US 11,592,602 B2
(45) Date of Patent: Feb. 28, 2023

(54) SUB-WAVELENGTH STRUCTURAL MATERIAL HAVING PATCH TYPE ARRAY AND COMPATIBILITY OF LOW DETECTABILITY FOR INFRARED, LASER, AND MICROWAVE

(71) Applicant: The Institute of Optics and Electronics, The Chinese Academy of Sciences, Sichuan (CN)

(72) Inventors: Xiangang Luo, Sichuan (CN); Mingbo Pu, Sichuan (CN); Xiong Li, Sichuan (CN); Xiaoliang Ma, Sichuan (CN); Guoqing Shen, Sichuan (CN)

(73) Assignee: The Institute of Optics and Electronics, Chinese Academy of Sciences, Sichuan (CN)

( * ) Notice: Subject to any disclaimer, the term of this patent is extended or adjusted under 35 U.S.C. 154(b) by 514 days.

(21) Appl. No.: 16/652,861

(22) PCT Filed: Jul. 17, 2018

(86) PCT No.: PCT/CN2018/095955
§ 371 (c)(1),
(2) Date: Apr. 1, 2020

(87) PCT Pub. No.: WO2019/114268
PCT Pub. Date: Jun. 20, 2019

(65) Prior Publication Data
US 2020/0249376 A1   Aug. 6, 2020

(30) Foreign Application Priority Data
Dec. 13, 2017  (CN) .......................... 201711327722.8

(51) Int. Cl.
*G02B 1/00* (2006.01)
*G02B 5/02* (2006.01)
(Continued)

(52) U.S. Cl.
CPC .......... *G02B 5/0284* (2013.01); *G02B 1/002* (2013.01); *G02B 5/003* (2013.01); *G02B 5/0215* (2013.01);
(Continued)

(58) Field of Classification Search
CPC ............ F41H 3/00; F41H 3/02; G02B 1/002; G02B 5/003; G02B 5/0205; G02B 5/021;
(Continued)

(56) References Cited

U.S. PATENT DOCUMENTS 9,128,230 B1 * 9/2015 Mohamed ............... G01J 5/046
9,735,885 B1   8/2017 Sayyah et al.
2020/0285082 A1 * 9/2020 Chanda ..................... F41H 3/00

FOREIGN PATENT DOCUMENTS

CN      103158299 A      6/2013
CN      106003864 A      10/2016
(Continued)

OTHER PUBLICATIONS

Extended European Search Report for EP Application No. 18888397.9 dated Aug. 10, 2021 (7 pages).
(Continued)

*Primary Examiner* — Ryan S Dunning
(74) *Attorney, Agent, or Firm* — Merchant & Gould P.C.

(57) ABSTRACT

The present disclosure provides a sub-wavelength structural material having compatibility of low detectability for infrared, laser, and microwave, which includes, from top to bottom, a metal type frequency selective surface layer I, a dielectric layer I, a metal type frequency selective surface layer II, a dielectric layer II, a resistive film, a dielectric layer III. Each of the metal type frequency selective surface layers is a sub-wavelength patch type array, and metal used by the metal type frequency selective surface layers has a characteristic of low infrared emissivity. The present disclosure
(Continued)

modulates a phase by using a phase difference generated by patches with different sizes on the metal type frequency selective surface layer I, so as to control backscattering of incident electromagnetic waves to achieve compatibility of low detectability for laser and infrared, while the bottom three layers achieve absorption of microwave.

12 Claims, 3 Drawing Sheets

(51) Int. Cl.
- *F41H 3/00* (2006.01)
- *H01Q 15/00* (2006.01)
- *H01Q 15/14* (2006.01)
- *H01Q 17/00* (2006.01)
- *G02B 5/00* (2006.01)

(52) U.S. Cl.
CPC ......... *H01Q 15/0026* (2013.01); *H01Q 17/00* (2013.01); *F41H 3/00* (2013.01); *G02B 5/0294* (2013.01); *H01Q 15/142* (2013.01)

(58) Field of Classification Search
CPC .. G02B 5/0215; G02B 5/0268; G02B 5/0273; G02B 5/0284; G02B 5/0294; H01Q 15/0006; H01Q 15/0013; H01Q 15/0026; H01Q 15/14; H01Q 15/141; H01Q 15/142; H01Q 17/00; H01Q 17/008
See application file for complete search history.

(56) References Cited

FOREIGN PATENT DOCUMENTS

| CN | 106007799 A | 10/2016 |
|---|---|---|
| CN | 106767168 A | 5/2017 |
| CN | 108061929 A | 5/2018 |

OTHER PUBLICATIONS

International Search Report and Written Opinion of the International Searching Authority for International Patent Application No. PCT/CN2018/095955 dated Oct. 12, 2018, 8 pages.

Pan, W. et al., "Combining the Absorptive and Radiative Loss in Metasurfaces for Multi-Spectral Shaping of the Electromagnetic Scattering", Scientific Reports, 6: 21462-1-21462-8 (Feb. 2016).

\* cited by examiner

SUB-WAVELENGTH STRUCTURAL MATERIAL HAVING PATCH TYPE ARRAY AND COMPATIBILITY OF LOW DETECTABILITY FOR INFRARED, LASER, AND MICROWAVE

CROSS-REFERENCE TO RELATED APPLICATION(S)

This application is a National Stage Application of PCT/CN2018/095955, filed 17 Jul. 2018, which claims benefit of Serial No. 201711327722.8, filed 13 Dec. 2017 in China and which applications are incorporated herein by reference. A claim of priority is made to each of the above disclosed applications.

TECHNICAL FIELD

The present disclosure relates to the field of new multi-functional materials, and more particularly, to a sub-wavelength structural material having compatibility of low detectability for infrared, laser and microwave.

BACKGROUND

With the rapid development of multispectral detection technology, the application of monofunctional absorbing materials may no longer meet the current needs. Materials having compatibility for multiple bands, especially new absorbing materials having compatibility for laser, infrared and microwave, have become a development direction of researches in the related art. However, there are still some contradictions in achieving materials having compatibility of low detectability for infrared, laser and microwave bands. The reason is that the microwave band requires strong absorption and low reflection of electromagnetic waves, while the infrared band requires low absorption and high reflection. Although the laser also requires strong absorption and low reflection of electromagnetic waves, it operates in the infrared band, which is has contradiction with low detectability in the infrared band. Thus, a key of implementing compatibility of low detectability for infrared, laser and microwave is to address contradiction described above.

SUMMARY

I. Technical Problems to be Solved

The present disclosure provides a sub-wavelength structural material having compatibility of low detectability for infrared, laser and microwave, so as to at least partially solve the technical problems mentioned above.

II. Technical Solutions

According to one aspect of the present disclosure, there is provided a sub-wavelength structural material having compatibility of low detectability for infrared, laser, and microwave, comprising:
  a metal type frequency selective surface layer I, the metal type frequency selective surface layer I being a sub-wavelength patch type array;
  a dielectric layer I disposed below the metal type frequency selective surface layer I;
  a metal type frequency selective surface layer II disposed below the dielectric layer I, the metal type frequency selective surface layer II being also a sub-wavelength patch type array;
  a dielectric layer II disposed below the metal type frequency selective surface layer
  a resistive film layer disposed below the dielectric layer and
  a dielectric layer III disposed below the resistive film layer,
  wherein the metal type frequency selective surface layer I, the dielectric layer I and the metal type frequency selective surface layer II are used to realize low detectability for laser and infrared, and the dielectric layer II, the resistive film layer, the dielectric layer III, and a metal reflective plate are used to realize absorption of microwaves.

In some embodiments of the present disclosure, metal used by the metal type frequency selective surface layer I and the metal type frequency selective surface layer II has a characteristic of low infrared emissivity.

In some embodiments of the present disclosure, the metal having low infrared emissivity is gold, silver, aluminum, copper, or platinum.

In some embodiments of the present disclosure, the wavelength patch type array of the metal type frequency selective surface layer I has different patches having a reflection phase difference, so that effective scattering for incident infrared waves is realized by combining the different patches.

In some embodiments of the present disclosure, the metal type frequency selective surface layer II is used to provide reflection.

In some embodiments of the present disclosure, a thickness t1 of the metal type frequency selective surface layer I is 0.05 µm to 0.1 µm;
  a thickness t2 of the dielectric layer I is 1 µm to 2 µm;
  a thickness t3 of the metal type frequency selective surface layer II is 0.08 µm to 0.15 µm;
  a thickness t4 of the dielectric layer II is 1.6 mm to 3 mm;
  a thickness t5 of the resistive film layer is 0.01 mm to 0.03 mm; and
  a thickness t6 of the dielectric layer III is 1.2 mm to 2.8 mm.

In some embodiments of the present disclosure, a periodic unit size p of the metal type frequency selective surface layer I having the patch type array is 2.6 µm to 4.8 µm, and a scale factor x1 of the periodic unit p is 0.5 to 0.8, and a scale factor x2 of the periodic unit p is 0.1 to 0.4.

In some embodiments of the present disclosure, a periodic unit size q of the metal type frequency selective surface layer II having the patch type array is 2.6 µm to 4.8 µm, and a scale factory of the periodic unit q is 0.9 to 0.98.

In some embodiments of the present disclosure, a square resistance Rs of the resistive film layer is 20Ω/□ to 200Ω/□.

In some embodiments of the present disclosure, a dielectric constant Er1 of the dielectric layer I is 1.5 to 3.5, and a dielectric loss tan δ1 of the dielectric layer I is 0.001 to 0.03.

In some embodiments of the present disclosure, a dielectric constant Er2 of the dielectric layer II is 2 to 6, and a dielectric loss tan δ2 of the dielectric layer II is 0.001 to 0.09.

In some embodiments of the present disclosure, a dielectric constant Er3 of the dielectric layer III is 2 to 8, and a dielectric loss tan δ2 of the dielectric layer III is 0.001 to 0.09.

III. Beneficial Effects

It may be seen from the above technical solutions that the sub-wavelength structural material having compatibility of low detectability for infrared, laser, and microwave of the present disclosure have at least one of the following beneficial effects:

(1) A shortcoming in the related art that stealth may not be realized for both infrared and laser at the same time is overcome, and a principle of phase modulation scattering is used to meet stealth for the radar and infrared while achieving the stealth for the laser, thereby extending the application range.

(2) Integration of low detectability functions for infrared, laser, and microwave may be effectively realized, there is a significant effect of compatibility of low detectability for infrared, laser, and microwave, and the material has a characteristic of simple and thin structure.

BRIEF DESCRIPTION OF THE ACCOMPANYING DRAWINGS

Figure 1A:
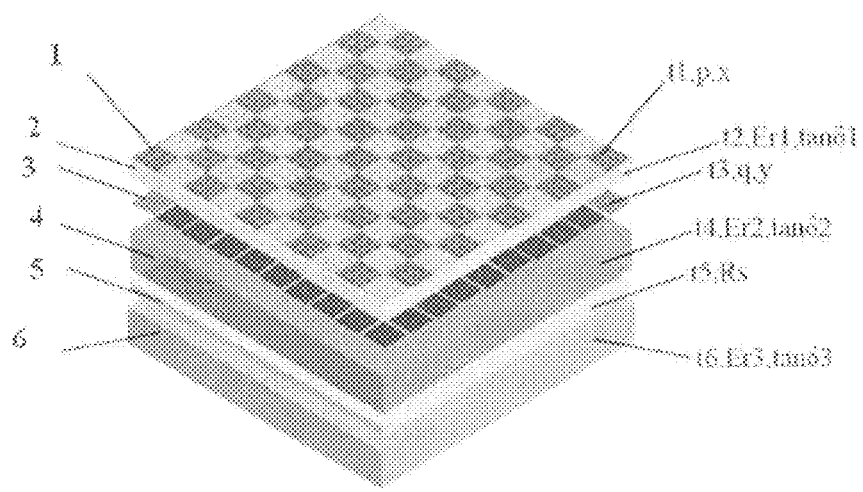
FIG. 1(a) is an overall structural diagram of a sub-wavelength structural material having compatibility of low detectability for infrared, laser, and microwave according to an embodiment of the present disclosure.

DESCRIPTION OF SYMBOLS OF MAIN COMPONENTS IN THE EMBODIMENT OF THE PRESENT DISCLOSURE IN THE ACCOMPANYING DRAWINGS

1. Metal type Frequency Selective Surface layer (MFSS) I;
2. Dielectric layer I;
3. Metal type Frequency Selective Surface layer (MFSS) II;
4. Dielectric layer II;
5. Resistive film layer; and
6. Dielectric layer III.

DETAILED DESCRIPTION

The present disclosure provides a sub-wavelength structural material having compatibility of low detectability for infrared, laser, and microwave. The sub-wavelength structural material includes, from top to bottom, a metal type frequency selective surface layer I, a dielectric layer I, a metal type frequency selective surface layer II, a dielectric layer II, a resistive film layer, and a dielectric layer III. Here, the metal type frequency selective surface layers are both sub-wavelength patch type arrays, and metal used by the metal type frequency selective surface layers has a characteristic of low infrared emissivity.

In the above sub-wavelength structural material having compatibility of low detectability for infrared, laser, and microwave, the metal selected for the metal type frequency selective surface layers has the characteristic of low infrared emissivity, and preferably is gold, silver, aluminum, copper or platinum.

In the above sub-wavelength structural material having compatibility of low detectability for infrared, laser, and microwave, a thickness t1 of the metal type frequency selective surface layer I is 0.05 μm to 0.1 μm, a thickness of the dielectric layer I is 1 μm to 2 μm, a thickness of the metal type frequency selective surface layer II is 0.08 μm to 0.15 μm, a thickness of the dielectric layer II is 1.6 mm to 3 mm, a thickness of the resistive film layer is 0.01 mm to 0.03 mm, and a thickness of the dielectric layer III is 1.2 mm to 2.8 mm. The thicknesses of the dielectric layer II and the dielectric layer III are not necessarily limited thereto. Under the premise of ensuring the effect of low detectability, the smaller the total thickness of the material, the better, because the total volume and cost may be reduced accordingly. In this case, the applicability of the material may also be improved.

In the above sub-wavelength structural material having compatibility of low detectability for infrared, laser, and microwave, a periodic unit size p of the metal type frequency selective surface layer I having the patch type array is 2.6 μm to 4.8 μm, a scale factor x1 of the periodic unit p is 0.5 to 0.8, and a scale factor x2 of the periodic unit p is 0.1 to 0.4; and a periodic unit size q of the metal type frequency selective surface layer II having the patch type array is 2.6 μm to 4.8 μm, and a scale factory of the periodic unit q is 0.9 to 0.98.

In the above sub-wavelength structural material having compatibility of low detectability for infrared, laser, and microwave, a square resistance Rs of the resistive film layer is 20Ω/□ to 200Ω/□.

In the above sub-wavelength structural material having compatibility of low detectability for infrared, laser, and microwave, a dielectric constant Er1 of the dielectric layer I is 1.5 to 3.5, and a dielectric loss tan δ1 of the dielectric layer I is 0.001 to 0.03; a dielectric constant Er2 of the dielectric layer II is 2 to 6, and a dielectric loss tan δ2 of the dielectric layer II is 0.001 to 0.09; and a dielectric constant Er3 of the dielectric layer III is 2 to 8, and a dielectric loss tan δ3 of the dielectric layer III is 0.001 to 0.09.

The above technical solutions according to the present disclosure are mainly based on the following principle: for the microwave band, the basic requirement is to absorb the microwave incident on a surface of the material, and reduce the reflected microwave as much as possible. Therefore, the impedance of the microwave absorbing material is required to approximately match with vacuum impedance, and thereby, less microwaves are reflected, and greater absorption is achieved. For the infrared wave band, it is required that the infrared wave incident on the surface of the material is reflected back to the maximum extent, the absorption becomes smaller, and the infrared radiation is reduced. As for the laser, it is required to absorb the infrared laser incident on the surface of the material, and minimize the reflection of the infrared laser. It may be seen that the two principles are completely opposite when the material is irradiated by infrared waves. For compatibility of the laser and infrared wave bands, the present disclosure uses the optical principle of scattering to replace absorption and reflection, so that infrared waves and laser irradiated on the surface of the material are scattered toward all directions to reduce reflected echoes to achieve low detectability. In the present disclosure, in order to achieve scattering, the metal type frequency selective surface layer I is composed of a patch array, and effective scattering of incident infrared waves is achieved by combining different patches having a reflection phase difference. The scattering effect is represented by a Radar Scattering Section (RCS). At the same time, the metal type frequency selective surface layer II provides reflection, and since a skin depth of the two metal layers is much smaller than the microwave wavelength, the microwave may pass through and be absorbed by the microwave layer.

It is helpful to define some specific vocabulary definitions before describing the solution to the problem. The meaning of each parameter in the embodiments of the present disclosure is shown in Table 1 below.

TABLE 1

Respective structural parameters and meanings thereof for the sub-wavelength structural material having compatibility of low detectability for infrared, laser and microwave

| | |
|---|---|
| Metal type frequency selective surface layer I | t1: thickness of the metal frequency selective surface layer I<br>p: periodic unit size of the metal type frequency selective surface layer I<br>x1: scale factor of one periodic unit of the metal type frequency selective surface layer I<br>x2: scale factor of another periodic unit of the metal type frequency selective surface layer I |
| Dielectric layer I | t2: thickness of the dielectric layer I<br>Er1: dielectric constant of the dielectric layer I<br>tanδ1: dielectric loss of the dielectric layer I |
| Metal type frequency selective surface layer II | t3: thickness of the metal type frequency selective surface layer II<br>q: periodic unit size of the metal type frequency selective surface layer II<br>y: scale factor of a periodic unit of the metal type frequency selective surface layer II |
| Dielectric layer II | t4: thickness of the dielectric layer II<br>Er2: dielectric constant of the dielectric layer II<br>tanδ2: dielectric loss of the dielectric layer II |
| Resistive film layer | t5: thickness of the resistive film layer<br>Rs: square resistance of the resistive film layer |
| Dielectric layer III | t6: thickness of the dielectric layer III<br>Er3: dielectric constant of the dielectric layer III<br>tanδ3: dielectric loss of the dielectric layer III |

In order to make the objectives, technical solutions, and advantages of the present disclosure more clear, the present disclosure is further described in detail below with reference to specific embodiments and with reference to the accompanying drawings.

Certain embodiments of the present disclosure will be described more fully hereinafter with reference to the accompanying drawings. Some, but not all, of these embodiments will be shown. Indeed, various embodiments of the present disclosure may be embodied in many different forms and should not be construed as being limited to the embodiments set forth herein. Instead, these embodiments are provided so that the present disclosure will satisfy applicable legal requirements.

In a first exemplary embodiment of the present disclosure, there is provided a sub-wavelength structural material having compatibility of low detectability for infrared, laser, and microwave. FIG. 1(a) is an overall structural diagram of a sub-wavelength structural material having compatibility of low detectability for infrared, laser, and microwave. As shown in FIG. 1(a), the sub-wavelength structural material includes, from top to bottom, a metal type frequency selective surface layer I 1, a dielectric layer I 2, a metal type frequency selective surface layer II 3, a dielectric layer II 4, a resistive film 5 and a dielectric layer III 6, and respective structural parameter values thereof are shown in Table 2 below.

TABLE 2

Respective structural parameter values for the sub-wavelength structural material having compatibility of low detectability for infrared, laser, and microwave in the first embodiment

| Metal type frequency selective surface layer I | | | | Dielectric layer I | | | Metallic frequency selective surface layer II | | | Dielectric layer II | | | Resistive film layer | | Dielectric layer III | | |
|---|---|---|---|---|---|---|---|---|---|---|---|---|---|---|---|---|---|
| t1 (μm) | p | x1 | x2 | t2 (μm) | Er1 | tanδ1 | t3 (μm) | q | y | t3 (mm) | Er2 | tanδ2 | t5 (mm) | Rs Ω/□ | t6 (mm) | Er3 | tanδ3 |
| 0.1 | 3.8 | 0.75 | 0.2 | 1.3 | 2.2 | 0.003 | 0.1 | 3.8 | 0.975 | 2.2 | 3.5 | 0.05 | 0.01 | 160 | 2.3 | 3.5 | 0.05 |

Figure 1B:
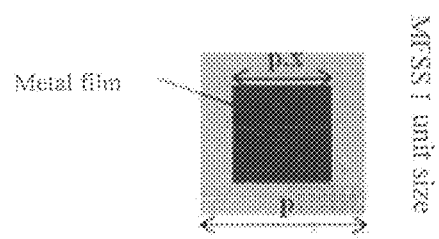
FIG. 1(b) is a structural diagram of a metal type frequency selective surface layer I.
Figure 1C:
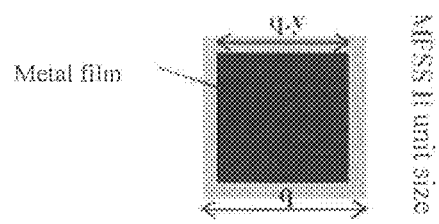
FIG. 1(c) is a structural diagram of a metal type frequency selective surface layer II.

FIG. 1(b) is a schematic structural diagram of a metal type frequency selective surface layer I, where a periodic unit size of the metal type frequency selective surface layer I is p and a size of the metal film is p*x. Since the metal type frequency selective surface layer I needs to modulate a phase by using a phase difference generated by patches with different sizes, so as to control backscattering of incident electromagnetic waves, thereby achieving compatibility of low detectability between laser and infrared, there are two scale factors x1 and x2 in this embodiment. FIG. 1(c) is a structural diagram of the metal type frequency selective surface layer II. A periodic unit size of the metal type frequency selective surface layer II is q, and a size of the metal film is q*y.

Figure 2:
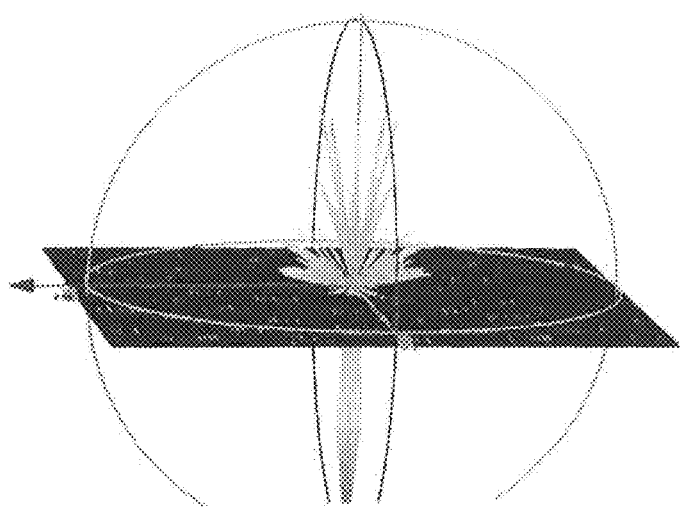
FIG. 2 is a diagram of far-field scattering of a sub-wavelength structural material having compatibility of low detectability for infrared, laser, and microwave being at a laser wavelength of 10.6 μm according to an embodiment of the present disclosure.
Figure 3:
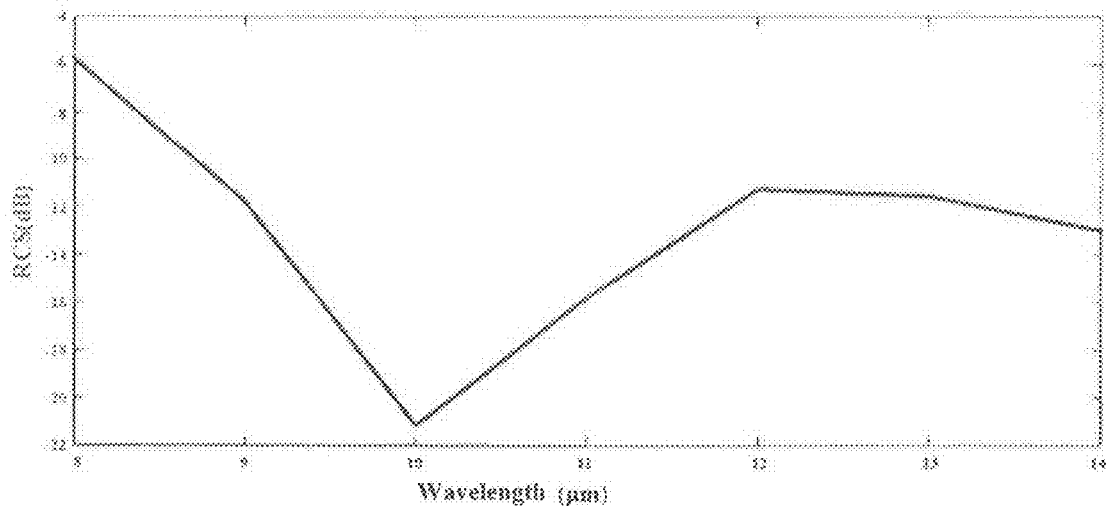
FIG. 3 is a diagram of RCS reduction of a sub-wavelength structural material having compatibility of low detectability for infrared, laser, and microwave at an infrared wavelength of 8-14 μm according to a first embodiment of the present disclosure.
Figure 4:
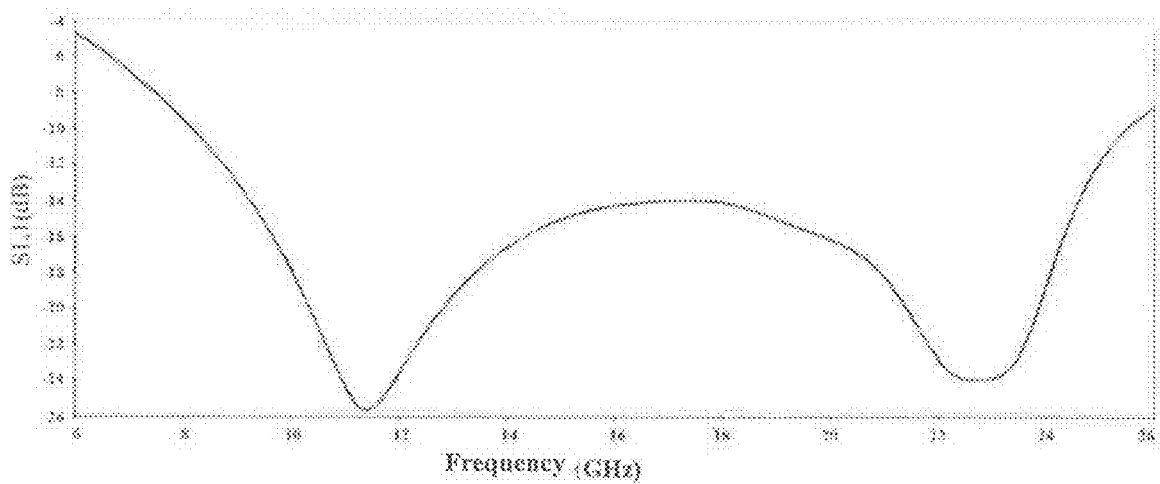
FIG. 4 is a graph of reflectivity of a sub-wavelength structural material having compatibility of low detectability for infrared, laser, and microwave being at 6-26 GHz according to the first embodiment of the present disclosure.

This embodiment demonstrates the effect of low detectability for infrared and laser in the present disclosure by far-field scattering and RCS reduction amounts, and proves the effect of absorption of microwave by reflectivity. FIG. 2 is a diagram of far-field scattering when a wavelength of the laser or infrared is equal to 10.6 µm according to the present disclosure, and a significant scattering effect may be seen. FIG. 3 is a diagram of RCS reduction when a wavelength range of the laser or infrared is 8 to 14 µm according to the present disclosure. It may be seen that the RCS reduction close to −10 dB is achieved in the range of 8-14 µm. FIG. 4 is a graph of reflectivity in a range of 6-26 GHz according to the present disclosure, and it may be seen that the present disclosure achieves a reflectivity of less than −10 dB in the range of 8.5-25 GHz. The present disclosure realizes low detectability for infrared, laser and microwave.

So far, the embodiments of the present disclosure have been described in detail with reference to the drawings. It should be noted that, in the drawings or the text of the description, implementation manners not shown or described are in a form known to those skilled in the art and have not been described in detail. In addition, the above definitions of the elements and methods are not limited to the various specific structures, shapes, or methods mentioned in the embodiments, and those skilled in the art can simply modify or replace them.

It should also be noted that the directional terms mentioned in the embodiments, such as "up", "down", "front", "rear", "left", "right", etc., are only directions referring to the drawings, and are not used to limit the protection scope of the present disclosure. Throughout the drawings, the same elements are represented by the same or similar reference numerals. Conventional structures or constructions will be omitted so as not to cause confusion in the understanding of the present disclosure.

In addition, shapes and sizes of the components in the drawings do not reflect the true size and proportion, but merely illustrate the content of the embodiments of the present disclosure. In addition, in the claims, any reference numerals placed between parentheses shall not be construed as limiting the claims.

Unless otherwise known, numerical parameters in this specification and the appended claims are approximate and can be changed according to the required characteristics obtained by the content of the present disclosure. Specifically, all numbers used in the specification and claims to indicate the content of the composition, reaction conditions, etc. should be understood to be modified by the term "about" in all cases. In general, the meaning of the expression is to include a certain amount of ±10% change in some embodiments, ±5% change in some embodiments, ±1% change in some embodiments, and ±0.5% change in some embodiments.

Furthermore, the word "comprising" does not exclude the presence of elements or steps not listed in a claim. The word "a" or "an" preceding an element does not exclude the presence of a plurality of such elements.

The ordinal numbers used in the description and claims, such as "first", "second", "third", etc., to modify the corresponding element, do not mean that the element has any ordinal number, nor represent an order of an element and another element, or an order of manufacturing methods. The use of these ordinal numbers is only used to make a component with a certain name clearly distinguishable from another with the same name.

Similarly, it should be understood that, in order to make the present disclosure concise and help understand one or more of the various disclosed aspects, in the above description of exemplary embodiments of the present disclosure, various features of the present disclosure are sometimes grouped together into a single embodiment, figure, or description thereof. However, this disclosed method should not be construed to reflect the intention that the claimed disclosure requires more features than those explicitly recited in each claim. Rather, as reflected in the attached claims, the disclosed aspect has less features than all features of the single embodiment disclosed above. Thus, the claims that follow a specific embodiment are hereby explicitly incorporated into this specific embodiment, where each claim itself serves as a separate embodiment of the present disclosure.

The specific embodiments described above further describe the objectives, technical solutions and beneficial effects of the present disclosure in detail. It should be understood that the above is only specific embodiments of the present disclosure and is not intended to limit the present disclosure. Any modification, equivalent substitution, improvement etc. made within the spirit and principle of the present disclosure shall be included in the protection scope of the present disclosure.

We claim:

1. A sub-wavelength structural material having compatibility of low detectability for infrared, laser, and microwave, comprising:
    a metal type frequency selective surface layer I, the metal type frequency selective surface layer I being a sub-wavelength patch type array;
    a dielectric layer I disposed below the metal type frequency selective surface layer I;
    a metal type frequency selective surface layer II disposed below the dielectric layer I, the metal type frequency selective surface layer II being also a sub-wavelength patch type array;
    a dielectric layer II disposed below the metal type frequency selective surface layer II;
    a resistive film layer disposed below the dielectric layer II; and
    a dielectric layer III disposed below the resistive film layer,
    wherein the metal type frequency selective surface layer I, the dielectric layer I and the metal type frequency selective surface layer II are used to realize low detectability for laser and infrared, and the dielectric layer II, the resistive film layer, the dielectric layer III, and a metal reflective plate are used to realize absorption of microwaves.

2. The sub-wavelength structural material according to claim 1, wherein
    a thickness t1 of the metal type frequency selective surface layer I is 0.05 µm to 0.1 µm;

a thickness t2 of the dielectric layer I is 1 μm to 2 μm;

a thickness t3 of the metal type frequency selective surface layer II is 0.08 μm to 0.15 μm;

a thickness t4 of the dielectric layer II is 1.6 mm to 3 mm;

a thickness t5 of the resistive film layer is 0.01 mm to 0.03 mm; and a thickness t6 of the dielectric layer III is 1.2 mm to 2.8 mm.

3. The sub-wavelength structural material according to claim 1, wherein a square resistance Rs of the resistive film layer is 20Ω/□ to 200Ω/□.

4. The sub-wavelength structural material according to claim 1, wherein a dielectric constant Er1 of the dielectric layer I is 1.5 to 3.5, and a dielectric loss tan δ1 of the dielectric layer I is 0.001 to 0.03.

5. The sub-wavelength structural material according to claim 1, wherein a dielectric constant Er2 of the dielectric layer II is 2 to 6, and a dielectric loss tan δ2 of the dielectric layer II is 0.001 to 0.09.

6. The sub-wavelength structural material according to claim 1, wherein a dielectric constant Er3 of the dielectric layer III is 2 to 8, and a dielectric loss tan δ2 of the dielectric layer III is 0.001 to 0.09.

7. The sub-wavelength structural material according to claim 1, wherein metal used by the metal type frequency selective surface layer I and the metal type frequency selective surface layer II has a characteristic of low infrared emissivity.

8. The sub-wavelength structural material according to claim 7, wherein the metal having low infrared emissivity is gold, silver, aluminum, copper, or platinum.

9. The sub-wavelength structural material according to claim 7, wherein the metal type frequency selective surface layer I has different patches having a reflection phase difference, so that effective scattering for incident infrared waves is realized by combining the different patches.

10. The sub-wavelength structural material according to claim 7, wherein the metal type frequency selective surface layer II is used to provide reflection.

11. The sub-wavelength structural material according to claim 7, wherein a periodic unit size p of the metal type frequency selective surface layer I having the patch type array is 2.6 μm to 4.8 μm, and a scale factor x1 of the periodic unit p is 0.5 to 0.8, and a scale factor x2 of the periodic unit p is 0.1 to 0.4.

12. The sub-wavelength structural material according to claim 7, wherein a periodic unit size q of the metal type frequency selective surface layer II having the patch type array is 2.6 μm to 4.8 μm, and a scale factory of the periodic unit q is 0.9 to 0.98.

* * * * *